United States Patent
Tseng

(10) Patent No.: US 9,980,159 B2
(45) Date of Patent: May 22, 2018

(54) RRC RE-ESTABLISHMENT ON SECONDARY ENODEB FOR DUAL CONNECTIVITY

(71) Applicant: MEDIATEK INC., Hsinchu (TW)

(72) Inventor: Li-Chuan Tseng, Taipei (TW)

(73) Assignee: MEDIATEK INC., HsinChu (TW)

( * ) Notice: Subject to any disclaimer, the term of this patent is extended or adjusted under 35 U.S.C. 154(b) by 108 days.

(21) Appl. No.: 14/863,533

(22) Filed: Sep. 24, 2015

(65) Prior Publication Data

US 2016/0095004 A1 Mar. 31, 2016

Related U.S. Application Data

(60) Provisional application No. 62/055,697, filed on Sep. 26, 2014.

(51) Int. Cl.
*H04W 24/04* (2009.01)
*H04W 72/04* (2009.01)
(Continued)

(52) U.S. Cl.
CPC ........... *H04W 24/04* (2013.01); *H04W 48/00* (2013.01); *H04W 72/048* (2013.01);
(Continued)

(58) Field of Classification Search
None
See application file for complete search history.

(56) References Cited

U.S. PATENT DOCUMENTS

| 8,588,057 | B2 | 11/2013 | Dimou et al. | 455/437 |
| 8,792,891 | B2 * | 7/2014 | Han | H04W 76/028 455/434 |
| 2012/0327908 | A1 | 12/2012 | Gupta et al. | 370/331 |
| 2013/0028069 | A1 * | 1/2013 | Pelletier | H04W 72/0453 370/216 |
| 2013/0182555 | A1 * | 7/2013 | Raaf | H04W 36/0033 370/216 |

(Continued)

FOREIGN PATENT DOCUMENTS

| CN | 101998664 A | 3/2011 |
| CN | 103687053 A | 3/2014 |

(Continued)

OTHER PUBLICATIONS

International Search Report and Written Opinion of International Search Authority for PCT/CN2015/090775 dated Dec. 31, 2015 (11 pages).

(Continued)

*Primary Examiner* — Chi H Pham
*Assistant Examiner* — Vladislav Agureyev
(74) *Attorney, Agent, or Firm* — Imperium Patent Works; Zheng Jin

(57) ABSTRACT

An enhanced RRC re-establishment procedure on secondary base station (SeNB) is proposed. A UE with dual connectivity is connected to both a master base station (MeNB) and a secondary eNB (SeNB). The UE performs radio link monitoring (RLM) and radio link failure (RLF) procedures over PCELL served by the MeNB. Once RLF is detected, the UE performs RRC connection reestablishment with a selected cell. From SeNB perspective, the SeNB triggers proactive fetching of UE context from the MeNB to ensure a successful reestablishment. From MeNB perspective, the MeNB provides preference information to the UE for selecting a suitable cell for reestablishment. From UE perspective, the UE considers its mobility state during cell selection such that smallcells are skipped for reestablishment when the UE has high mobility.

8 Claims, 5 Drawing Sheets

(51) Int. Cl.
*H04W 76/02* (2009.01)
*H04W 48/00* (2009.01)
*H04W 72/00* (2009.01)

(52) U.S. Cl.
CPC ....... *H04W 76/025* (2013.01); *H04W 76/028* (2013.01); *H04W 72/00* (2013.01)

(56) References Cited

U.S. PATENT DOCUMENTS

| | | | | |
|---|---|---|---|---|
| 2013/0182563 A1* | 7/2013 | Johansson | ........... | H04W 76/027 370/228 |
| 2013/0183974 A1* | 7/2013 | Johansson | ........... | H04W 76/027 455/436 |
| 2014/0269575 A1 | 9/2014 | Zhang et al. | ................. | 370/329 |
| 2014/0369313 A1* | 12/2014 | Li | .................... | H04W 36/0033 370/331 |
| 2015/0004981 A1* | 1/2015 | Iyer | .................... | H04W 76/028 455/437 |
| 2015/0043492 A1* | 2/2015 | Baek | .................. | H04W 76/025 370/329 |
| 2015/0045035 A1* | 2/2015 | Nigam | .................. | H04W 36/30 455/436 |
| 2015/0117183 A1* | 4/2015 | Heo | .................. | H04W 36/0055 370/228 |
| 2015/0223095 A1* | 8/2015 | Centonza | .......... | H04W 36/0088 455/67.11 |
| 2015/0230134 A1* | 8/2015 | Chiba | ............... | H04W 36/0016 370/331 |
| 2015/0237540 A1* | 8/2015 | Van Lieshout | ... | H04W 36/0055 455/436 |
| 2015/0358866 A1* | 12/2015 | Xu | ........................ | H04W 36/00 370/331 |
| 2016/0029376 A1* | 1/2016 | Fukuta | .............. | H04W 72/0426 370/329 |
| 2016/0066237 A1* | 3/2016 | Kato | ........................ | H04L 1/16 370/331 |
| 2016/0182276 A1* | 6/2016 | Wu | ..................... | H04W 76/028 370/225 |
| 2016/0338130 A1* | 11/2016 | Park | .................... | H04W 76/021 |
| 2017/0099621 A1* | 4/2017 | Michaelsen | ........... | H04W 36/08 |
| 2017/0238228 A1* | 8/2017 | Zhang | ................... | H04W 36/30 370/331 |

FOREIGN PATENT DOCUMENTS

| | | | | |
|---|---|---|---|---|
| EP | 2983405 A4 * | 11/2016 | ........ | H04W 72/0426 |
| WO | WO2009096883 A1 | 8/2009 | | |
| WO | WO2011127444 A2 | 10/2011 | | |
| WO | WO 2014206489 A1 * | 12/2014 | .......... | H04W 76/028 |
| WO | WO 2015113305 A1 * | 8/2015 | ........ | H04W 36/0061 |
| WO | WO 2015176738 A1 * | 11/2015 | ............ | H04W 36/08 |

OTHER PUBLICATIONS

3GPP TSG-RAN WG2 Meeting #87 R2-143633; Alcatel-Lucent et al.; Cell Selection during Re-Establishment in Dual Connectivity; Dresden, Germany dated Aug. 18-22, 2014 (2 pages).

3GPP TSG-RAN WG2 Meeting #87 R2-143788; Pantech; Reestablishment in Dual Connectivity; Dresden, Germany dated Aug. 18-22, 2014 (5 pages).

* cited by examiner

RRC RE-ESTABLISHMENT ON SECONDARY ENODEB FOR DUAL CONNECTIVITY

CROSS REFERENCE TO RELATED APPLICATIONS

This application claims the benefit under 35 U.S.C. § 119 from U.S. Provisional Application No. 62/055,697, entitled "RRC Re-establishment on SeNB for Dual Connectivity", filed on Sep. 26, 2014, the subject matter of which is incorporated herein by reference.

TECHNICAL FIELD

The disclosed embodiments relate generally to wireless networks supporting dual connectivity, and, more particularly, to RRC re-establishment on SeNB for dual connectivity.

BACKGROUND

A Long-Term Evolution (LTE) system offers high peak data rates, low latency, improved system capacity, and low operating cost resulting from simplified network architecture. LTE systems also provide seamless integration to older wireless network, such as GSM, CDMA and Universal Mobile Telecommunication System (UMTS). In LTE systems, an evolved universal terrestrial radio access network (E-UTRAN) includes a plurality of base stations, such as evolved Node-B's (eNBs) communicating with a plurality of mobile stations referred as user equipment (UEs). Dual Connectivity (DC) UE is introduced to enhance bandwidth and flexibility use of the network. A UE with dual connectivity has more than one transceivers corresponding to more than one MAC entities. The multiple MAC entities can be configured to communicate with multiple eNBs simultaneously.

In LTE Rel-10, the concept of carrier aggregation (CA) has been introduced to enhance the system throughput. With CA, two or more CCs are aggregated to support wider transmission bandwidth up to 100 MHz. A Rel-10 UE with reception and/or transmission capabilities for CA can simultaneously receive and/or transmit on multiple CCs corresponding to multiple serving cells. When CA is configured, the UE has only one RRC connection with the network. At RRC connection establishment/reestablishment or handover, one serving cell provides the NAS mobility information. At RRC connection reestablishment or handover, one serving cell provides the security input. This cell is referred to as the primary serving cell (PCELL), and other cells are referred to as the secondary serving cells (SCELLs). Depending on UE capabilities, SCELLs can be configured to form together with the PCELL as a set of serving cells.

The demand for higher bandwidth may require exploiting further on CA operation to aggregate cells from different base stations to serve a single UE, called inter-eNB carrier aggregation (inter-eNB CA). Inter-eNB CA not only can provide enhanced throughput, it offers other benefits such as spatial diversity (or so-called multi-site diversity) gain and reduction of mobility management overhead in heterogeneous networks (HetNet). In LTE Rel-12 and after, besides the macro eNBs, small eNBs with low transmission power and simplified protocol stacks or functionalities are introduced into E-UTRAN, which is referred to as HetNet smallcell networks. The smallcell architecture can enhance the data throughput and reduce the mobility signaling overhead.

In dual connectivity, a UE is simultaneously connected to a master eNB (MeNB) and a secondary eNB (SeNB) in a HetNet smallcell network. Radio link monitoring (RLM) and radio link failure (RLF) detection is applied on PCELL associated with the MeNB. Upon RLF, UE performs RRC connection re-establishment, in which the first step is to search for a suitable cell via cell selection. While the UE may intuitively try to re-establish RRC connection on the macrocell layer, for re-establishment due to RLF-related causes, it is likely that all suitable cells are associated with the SeNB.

The RRC re-establishment can succeed only when performed on an eNB with valid UE context, and such eNB is said to be a "prepared" eNB. Since a SeNB is not fully prepared, re-establishment on the SeNB is highly probable to fail. However, the re-establishment can be successfully completed if the SeNB has properly obtained the UE context. It is desirable to improve the re-establishment success rate for SeNB. Furthermore, it is desirable to only select a preferred SeNB for re-establishment based on smallcell HetNet and UE conditions.

SUMMARY

An enhanced RRC re-establishment procedure on secondary base station (SeNB) is proposed. A user equipment (UE) with dual connectivity is connected to both a master base station (MeNB) and a secondary eNB (SeNB). The UE performs radio link monitoring (RLM) and radio link failure (RLF) procedures over PCELL served by the MeNB. Once RLF is detected, the UE performs RRC connection reestablishment with a selected cell. From SeNB perspective, the SeNB triggers proactive fetching of UE context from the MeNB to ensure a successful reestablishment. From MeNB perspective, the MeNB provides preference information to the UE for selecting a suitable cell for reestablishment. From UE perspective, the UE considers its mobility state during cell selection such that smallcells are skipped for reestablishment when the UE has high mobility.

in a first embodiment, a UE establishes an RRC connection with a master base station (MeNB) in a mobile communication network. The UE communicates with both the MeNB over at least a primary cell (PCELL) and a secondary base station. (SeNB) over at least a secondary cell (SPELL). The UE has dual connectivity capability. The UE performs radio link monitoring (RLM) and radio link failure (RFL) procedures over the PCELL and detects an RLF event on the PCELL. The UE selects a cell for RRC connection reestablishment based on received preference information from the MeNB. The preference information indicates whether the SeNB is suitable for RRC connection reestablishment.

In a second embodiment, a master base station (MeNB) establishes an RRC connection with a UE over a primary cell (PCELL) in a mobile communication network. The MeNB transmits a cell addition request to a secondary base station (SeNB) for establishing a secondary cell (SCELL) between the UE and the SeNB. The MeNB provides cell selection preference information to the UE for RRC connection reestablishment. The preference information indicates whether the SeNB is suitable for RRC connection reestablishment.

In a third embodiment, a secondary base station (SeNB) receives a cell addition request from a master base station (MeNB) for establishing a secondary cell (SCELL) between a UE and the SeNB in a mobile communication network. A primary cell (PCELL) is established between the MeNB and the UE having dual connectivity capability. The SeNB sends a UE context fetch request to the MeNB upon satisfying a condition and in response receives UE context information. The SeNB receives an RRC connection reestablishment request from the UE. The SeNB has obtained the UE context information for completing a successful RRC connection reestablishment procedure.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
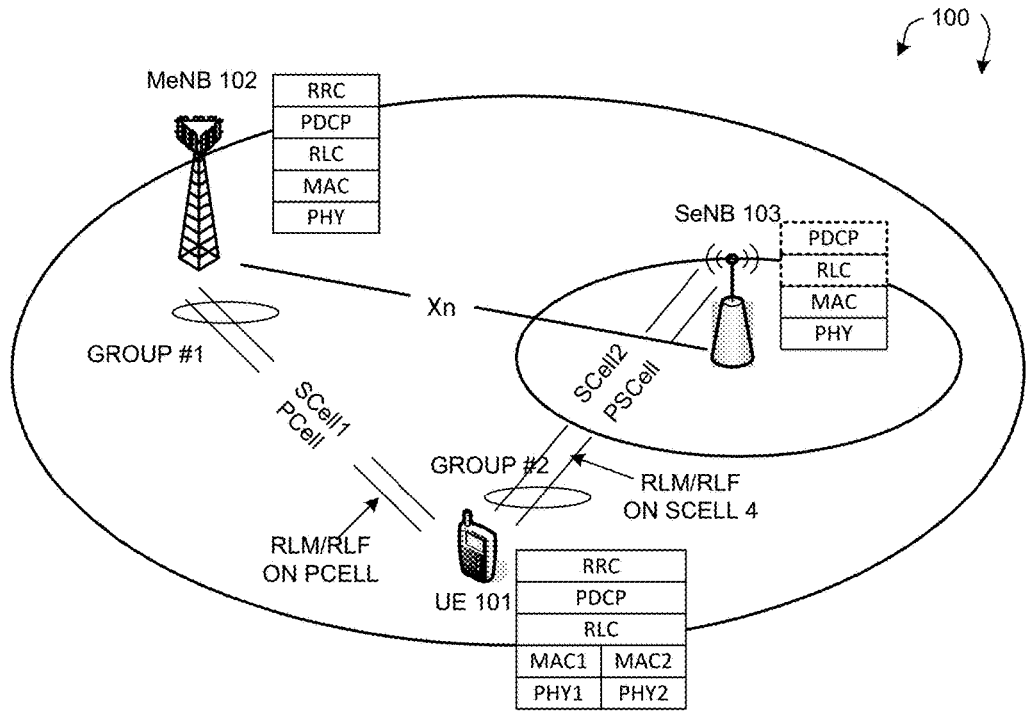
FIG. 1 illustrates a smallcell network with inter-eNB carrier aggregation (CA) and RLF/RLM mechanism and RRC re-establishment for Dual Connectivity UE in accordance with one novel aspect.

FIG. 1 illustrates a smallcell network 100 with inter-eNB carrier aggregation and RLF/RLM mechanism and RRC re-establishment for Dual Connectivity (DuCo) UE in a smallcell network 100 in accordance with one novel aspect. In 3GPP Long-Term Evolution (LTE) Rel-12 and after, besides normal base stations, small base stations with low transmission power and simplified protocol stacks and functionalities are introduced into E-UTRAN, which is referred to as smallcell networks. The smallcell architecture can be used to enhance the data throughput and to reduce the mobility signaling overhead. Smallcell network 100 comprises UE 101, a master base station MeNB 102, and a secondary base station SeNB 103.

As illustrated in FIG. 1, UE 101 establishes an RRC connection with MeNB 102 over at least a primary serving cell (e.g., PCELL and SCELL1 with MeNB), while served by one or more SeNBs over one or more secondary serving cells (e.g., PSCELL and SCELL2 by SeNB). When UE 101 is served by both MeNB and SeNB, the control of UE 101 and the user plane functionality is on the MeNB. Since a SeNB and a MeNB may not be physically collocated, there should be transmission medium and interface between the MeNB and the SeNB. Assume Xn interface is introduced for communications between the MeNB and the SeNB. From real deployment perspective, it cannot always assume the ideal backhaul connections, e.g., optical fiber, exist between the MeNB and the SeNB.

FIG. 1 also shows an exemplary DuCo architecture. The groups of serving cells associated with MeNB 102 and SeNB 103 are referred to master cell group (MCG) and secondary cell group (SCG), respectively. At UE 101 side, radio link monitoring (RLM) is implemented on the PCELL of MCG, in order to monitor the link quality toward MeNB, and declare radio link failure (RLF) when out-of-sync condition is detected. For SeNB, S-RLM and S-RLF on PSCell of SCG can be interpreted similarly. Upon RLF, UE 101 performs RRC connection re-establishment, in which the first step is to search for a suitable cell via cell selection. While UE 101 may intuitively try to re-establish RRC connection on the macrocell layer, for RRC connection re-establishment due to RLF-related causes, it is likely that all suitable cells are associated with the SeNB. The RRC connection re-establishment can succeed only when performed on an eNB with valid UE context, and such eNB is said to be a "prepared" eNB. Since a SeNB is typically not fully prepared, re-establishment on the SeNB is highly probable to fail. However, successful re-establishments on SeNB are still possible by applying current RRC re-establishment procedure and reusing other RRC procedures already defined in the specifications.

In accordance with one novel aspect, an enhanced RRC re-establishment procedure is proposed by addressing the following three problems: 1) How to implement UE context fetch between MeNB and SeNB? When the UE cell selection procedure finds that suitable cells are only associated with SeNB, RRC connection re-establishment is to be performed on SeNB. As the SeNB possesses only partial UE context, context fetch procedure is needed so that the SeNB can retrieve the UE context from MeNB. 2) How can MeNB assist cell selection on SeNB? Based on the information MeNB possesses, MeNB may inform the UE its preferences about cell selection on SeNB. MeNB may also inform the UE about the actual coverage of SeNB so that a high-mobility UE can skip smallcells and avoid frequent handover. 3) How can the UE itself improve its decision on cell selection? For example, the UE may consider mobility state in cell selection.

Figure 2:
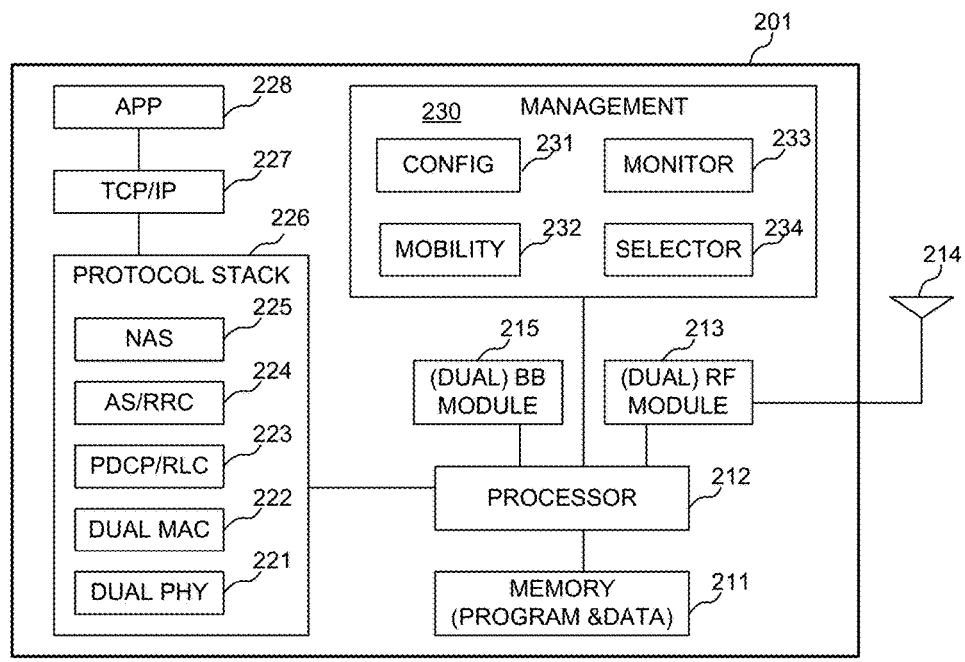
FIG. 2 is a simplified block diagram of a UE with dual connectivity that carries out certain embodiments of the present invention.

FIG. 2 is a simplified block diagram of a UE 201 with dual connectivity that carries out certain embodiments of the present invention. UE 201 has an antenna (or antenna array) 214, which transmits and receives radio signals. A RF transceiver module (or dual RF modules) 213, coupled with the antenna, receives RF signals from antenna 214, converts them to baseband signals and sends them to processor 212 via baseband module (or dual BB modules) 215. RF transceiver 213 also converts received baseband signals from processor 212 via baseband module 215, converts them to RF signals, and sends out to antenna 214. Processor 212 processes the received baseband signals and invokes different functional modules to perform features in UE 201. Memory 211 stores program instructions and data to control the operations of UE 201.

UE 201 also includes a 3GPP protocol stack module 226 supporting various protocol layers including NAS 225, AS/RRC 224, PDCP/RLC 223, dual MAC 222 and dual PHY 221, a TCP/IP protocol stack module 227, an application module APP 228. UE 201 with dual connectivity has two MAC entities. Two sets of upper layer stacks (RLC/PDCP) are configured for the MAC entities. At the RRC layer, only one RRC 224 is configured. RRC 224 controls the protocol stacks in corresponding to the MAC entities by communicating with the RRC entity of its serving MeNB.

UE 201 further comprises a management circuit 230 including a configuration circuit 231, a mobility estimation circuit 232, a monitor circuit 233, and a selection circuit 234. The circuits are function modules that can be configured and implemented by hardware, firmware, and software, or any combination thereof. The function modules, when executed by processor 212 (via program instructions and data contained in memory 211), interwork with each other to allow UE 201 to perform certain embodiments of the present invention accordingly. Configuration circuit 231 obtains configuration information from its serving MeNB and applies corresponding parameters, mobility estimation circuit 232 determines UE mobility based on UE speed, movement, and cell count, monitor circuit 233 performs radio link monitoring (RLM) and radio link failure (RLF) procedure, and selection circuit 234 performs cell selection for RRC reestablishment upon detecting RLF over the PCELL.

Figure 3:
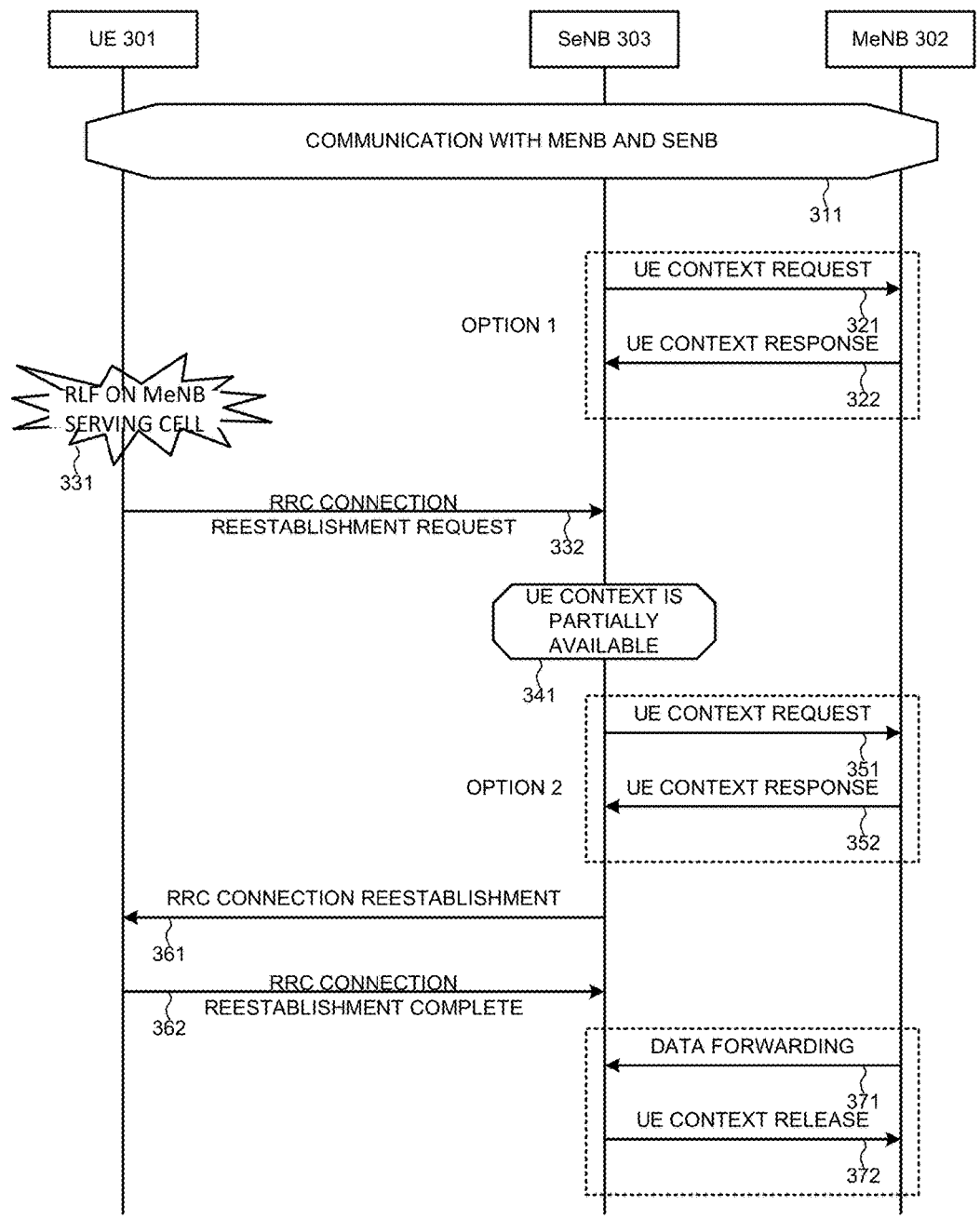
FIG. 3 illustrates one embodiment of RRC re-establishment on SeNB involving UE context fetch.

FIG. 3 illustrates one embodiment of RRC re-establishment on SeNB involving UE context fetch in a HetNet smallcell network. The smallcell network comprises a dual-connectivity UE 301, a master base station MeNB 302, and a secondary base station SeNB 303. In step 311, UE 301 establishes communication with both MeNB 302 (e.g., over at least one PCELL) and SeNB 303 (e.g., over at least one SCELL). Before declaring RLF, some measurement events are triggered in MeNB, and the MeNB enters the handover procedure accordingly. During handover procedure, the source eNB prepares target eNBs by forwarding UE context to the target eNBs. Notice that the source eNB may prepare multiple target eNBs. In DuCo, good channel condition between SeNB and UE is generally assumed, and therefore the SeNB may be one of the prepared eNBs. In case the SeNB is not a target eNB, it possesses only partial UE context and may not be considered fully prepared. However, this does not necessarily lead to failed RRC re-establishment on SeNB. If such a SeNB is selected, the "context fetch" procedure agreed for HetNet mobility can be reused to ensure successful re-establishment. The context fetch request may be sent proactively by the SeNB (Option 1), or sent after the SeNB receives re-establishment request from UE (Option 2).

In the example of FIG. 3, for option 1, SeNB 303 proactively sends a UE context fetch request to MeNB 302 (step 321), and receives the UE context response from MeNB 302 (step 322). In DuCo scenario, SeNB 303 already has much UE context (e.g., UE capability). However, SeNB 303 does not have full UE context, especially the AS layer context needed for RRC re-establishment. Such UE context may include the physical cell ID of the PCELL, the C-RNTI and short MAC-I of the UE. The information are included in the information element for reestablishment, but are not included in the inter-node messages SCG-ConfigInfo, which is sent to the SeNB from the MeNB when SCG is established and configured.

The SeNB can trigger the proactive fetching of UE context based on certain conditions. In one example, the SeNB is a small base station with lower transmission power and provides smaller cell coverage. In another example, the SeNB detects that the link quality with the UE is more vulnerable (e.g., in mmWave systems). In yet another example, the SeNB is located in a coverage hole of the overlaying macrocell. Under the above conditions, SeNB 303 may be triggered to proactively fetch the UE context from MeNB 302 so that it can become a fully prepared target base station before becoming the target of cell selection by the UE.

In step 331, UE 301 performs RLM/RLF procedure and detects RLF on MeNB PCELL. In step 332, UE 301 performs cell selection and sends an RRC connection reestablishment request to the selected SeNB 303. In step 341, SeNB determines whether it has full UE context or only partial UE context available. For option 2, SeNB 303 only has partial UE context up to this point. In step 351, SeNB 303 sends a UE context request to MeNB 302. In step 352, SeNB 303 receives UE context information from MeNB 302. In step 361, SeNB 303 sends an RRC connection reestablishment reply back to UE 301. In step 362, UE 301 sends an RRC connection reestablishment complete to SeNB 303. Finally, in step 371 MeNB 302 performs data forwarding to SeNB 303, and in step 372, SeNB 303 sends a UE context release back to MeNB 302.

From the discussions above, it can be seen that re-establishment on SeNB is possible using similar procedures defined in current specification. However, in some situations, some specific SeNBs should be skipped in cell selection (e.g., unprepared SeNBs). Furthermore, some UEs should not perform re-establishment on smallcell layer (e.g., high-mobility UE). Therefore, it is desirable for UE to determine whether to perform re-establishment on SeNB to improve performance.

Figure 4:
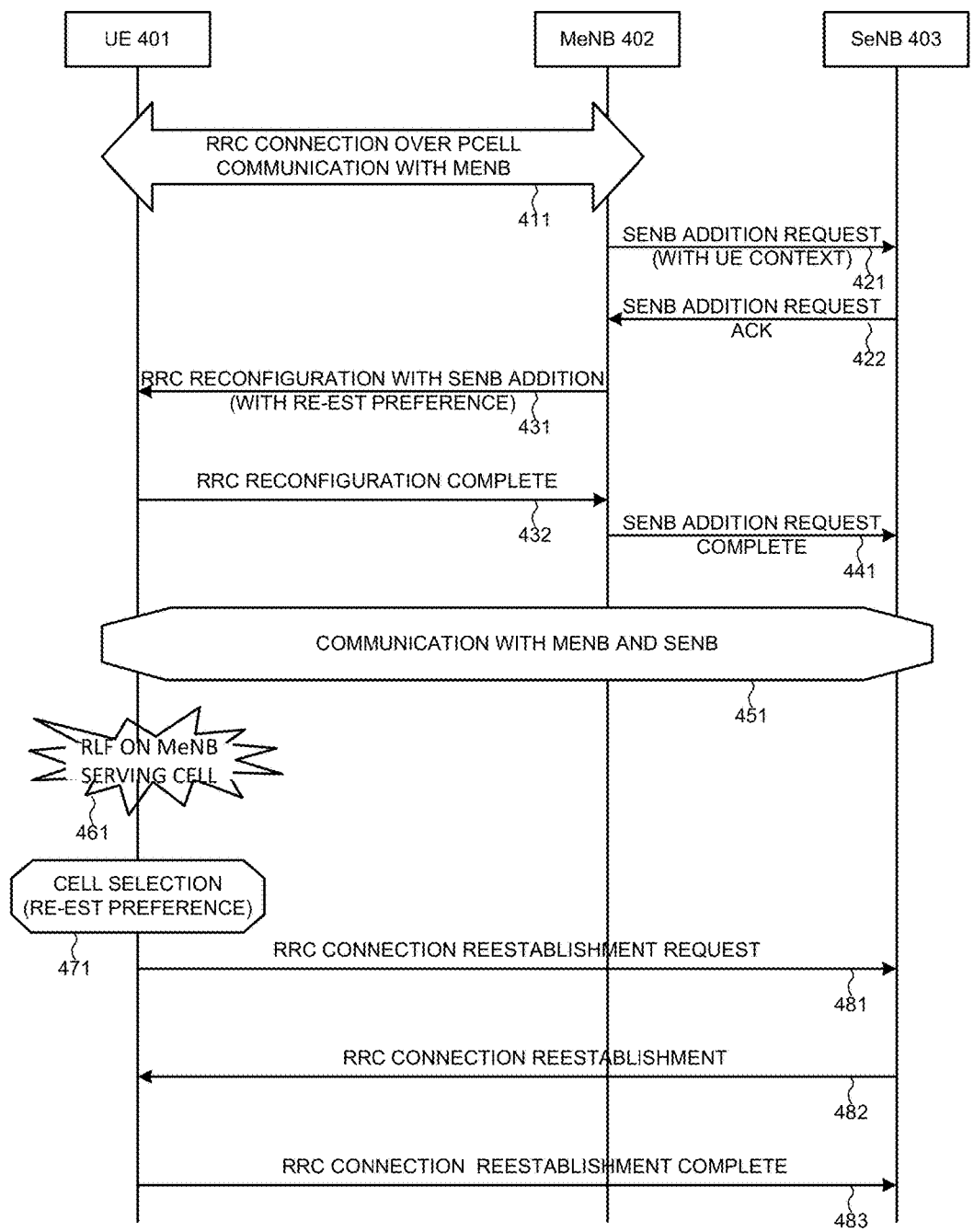
FIG. 4 illustrates one embodiment of RRC re-establishment on SeNB involving MeNB assistance.

FIG. 4 illustrates one embodiment of RRC re-establishment on SeNB involving MeNB assistance in a HetNet smallcell network. The smallcell network comprises a dual-connectivity UE 401, a master base station MeNB 402, and a secondary base station SeNB 403. In step 411, UE 401 and MeNB 402 establish an RRC connection over the PCELL for control and data communication with MeNB. To prepare SeNB, the MeNB may share UE context with the SeNB upon SeNB addition. For example, in step 421, MeNB 402 sends a SeNB addition request to SeNB 403. The SeNB addition request comprises not only SCG-ConfigInfo, but also the UE context. In step 422, SeNB 403 sends a SeNB addition request ACK back to MeNB 402. In step 431, MeNB 402 sends an RRC connection reconfiguration message to UE 401 for the SeNB addition. In step 432, UE 401 replies with an RRC connection reconfiguration complete to MeNB 402. In step 441, MeNB 402 sends a SeNB addition request complete message back to SeNB 403. In step 451, DuCo UE 401 establishes communication with both MeNB 402 (e.g., over at least one PCELL) and SeNB 403 (e.g., over at least one SCELL).

Although cell selection is performed by UE, it is beneficial if MeNB can inform UE of the preferred SeNBs or those to be skipped during cell selection for RRC re-establishment purpose. For example, if the backhaul delay is longer than some threshold, the UE context fetch may be too slow to allow successful re-establishment. In this case, the MeNB should inform the UE not to perform re-establishment on an unprepared SeNB. Therefore, a mechanism is needed for MeNB to inform UE about its preferences regarding RRC re-establishment on SeNB. The form of indication from MeNB includes but not limited to a positive list and a negative list of SeNBs.

Moreover, SeNB is defined as a "secondary" eNB with which the serving cells in SCG associate. Although the SeNB is typically regarded as a "small" eNB, establishment of SCG on an eNB with macro coverage is still possible. If SCG is established on a macro eNB, then it is unnecessary to restrict the UE from camping on SeNB. Even for small SeNBs, the actual coverage size can vary and may affect the values of offsets in S-criterion as well as other parameters. Therefore, since the UE may not possess such coverage information, the MeNB should inform the UE explicitly about the coverage of the SeNB or at least the SeNB type at SeNB setup.

In the example of FIG. 4, in step 431, during SeNB setup, MeNB 402 sends information to UE 401 about its preference regarding RRC re-establishment on SeNBs. For example, the information may include a list of SeNBs that are preferred for reestablishment (e.g., SeNBs that are already prepared for UE context or SeNBs with relatively larger cell coverage). The information may include a list of SeNBs that are not preferred for reestablishment (e.g., SeNBs that are not prepared and the backhaul delay is long or SeNBs with smaller cell coverage).

In step 461, UE 401 performs RLM/RLF and detects RLF on MeNB PCELL. In step 471, UE 401 performs cell selection for RRC connection reestablishment. The UE decision is based on the preference information that the UE receives from the MeNB in step 431. If SeNB 403 is selected for RRC reestablishment, then in step 481, UE 401 sends an RRC connection reestablishment request to SeNB 403. In step 482, SeNB 403 sends an RRC connection reestablishment reply back to UE 401. In step 483, UE 401 sends an RRC connection reestablishment complete to SeNB 403. If SeNB 403 is not selected, then UE 401 skips SeNB 403 and performs the RRC connection reestablishment with another selected base station. Because UE 401 is able to make informed cell selection decision based on MeNB preference, the performance of RRC connection reestablishment on SeNB is enhanced.

From UE aspect, one major reason supporting that a Dual connectivity capable UE to stay on macrocell layer, rather than camping on smallcell layer, is to avoid unnecessary mobility signaling overhead. To reduce such overhead, high mobility UE may need to skip smallcells when performing cell selection. Mobility state estimation (MSE) has been introduced in current specifications, and used in both TTT scaling for handover in RRC connected mode and $Q_{hyst}$ scaling for cell re-selection in RRC idle mode. On the other hand, in current cell selection process, the UE searches for the strongest cell on all supported carrier frequencies until it finds a suitable cell (i.e., on which the S-criterion is fulfilled).

In accordance with one novel aspect, two options are proposed to get MSE involved in the cell selection process: 1) UEs with high (and even medium) mobility skip smallcell layer during cell selection, and 2) Introduce MSE-related scaling factors in S-criterion. The values of signal strength and quality thresholds (Srxlev and Squal) are decreased under high and medium MSE. With Option 2, a SeNB may fulfill S-criterion even for a UE with higher mobility, as long as the RSRP and RSRQ are good enough. Therefore, it is proposed as an enhancement to introduce MSE to the cell selection process upon re-establishment in DuCo UEs. Furthermore, the effects of mobility state on cell selection include but not limited to skipping small cells for high mobility UEs and introducing scaling factors into S-criterion.

Figure 5:
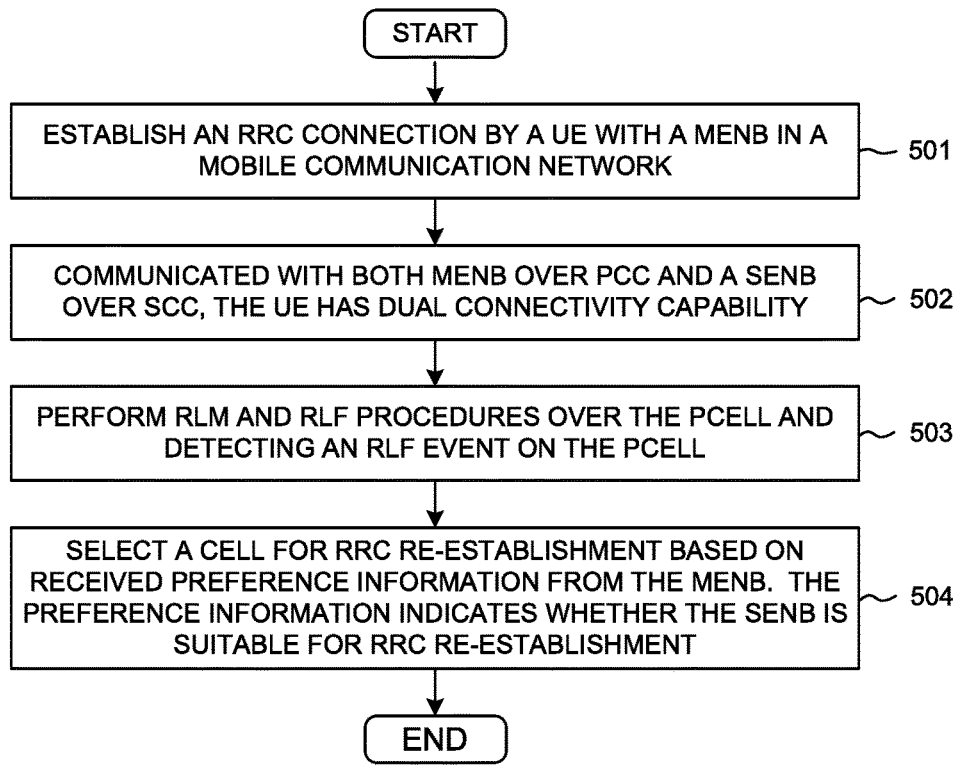
FIG. 5 is a flow chart of a method of RRC reestablishment on SeNB from UE perspective in a small cell network in accordance with one novel aspect.

FIG. 5 is a flow chart of a method of RRC reestablishment on. SeNB from UE perspective in a small cell network in accordance with one novel aspect. In step 501, a UE establishes an RRC connection with a master base station (MeNB) in a mobile communication network. In step 502, the UE communicates with both the MeNB over at least a primary cell (PCELL) and a secondary base station (SeNB) oven at least a secondary cell (SCELL). The LIE has dual connectivity capability. In step 503, the UE performs radio link monitoring (RIM) and radio link failure (RFL) procedures over the PCELL and detects an RLF event on the PCELL. In step 504, the UE selects a cell for RRC connection reestablishment based on received preference information from the MeNB. The preference information indicates whether the Se NB is suitable for RRC connection reestablishment.

Figure 6:
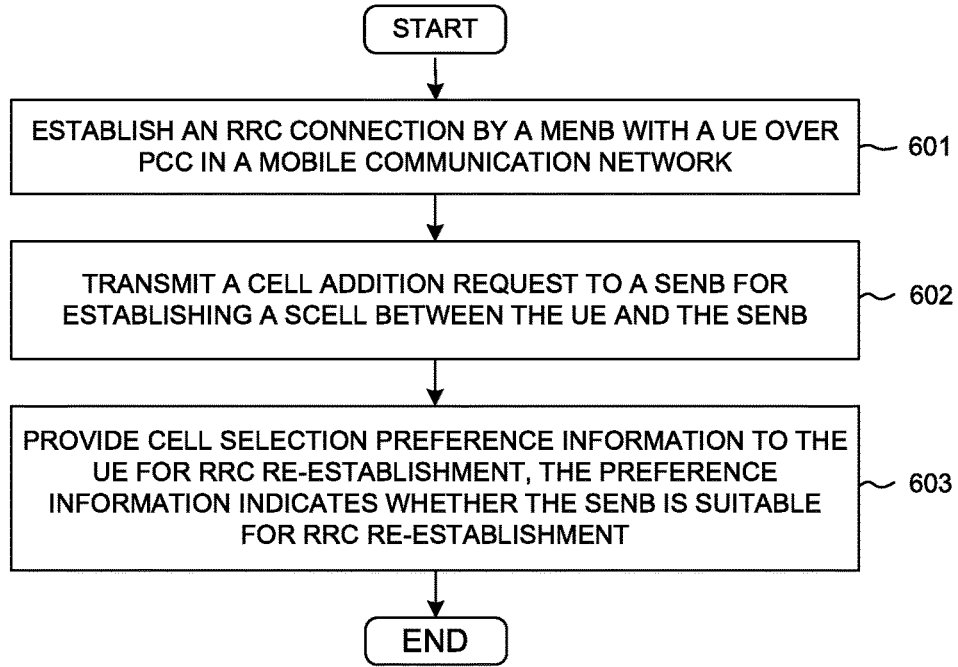
FIG. 6 is a flow chart of a method of RRC reestablishment on SeNB from MeNB perspective in a small cell network in accordance with one novel aspect.

FIG. 6 is a flow chart of a method of RRC reestablishment on. SeNB from MeNB perspective in a small cell network in accordance with one novel aspect. In step 601, a master base station (MeNB) establishes an RRC connection with a UE over a primary cell (PCELL) in a mobile communication network. In step 602, the MeNB transmits a cell addition request to a secondary base station (SeNB) for establishing a secondary cell (SCELL) between the UE and the SeNB. In step 603, the MeNB provides cell selection preference information to the UE for RRC connection reestablishment. The preference information indicates whether the SeNB is suitable for RRC connection reestablishment.

Figure 7:
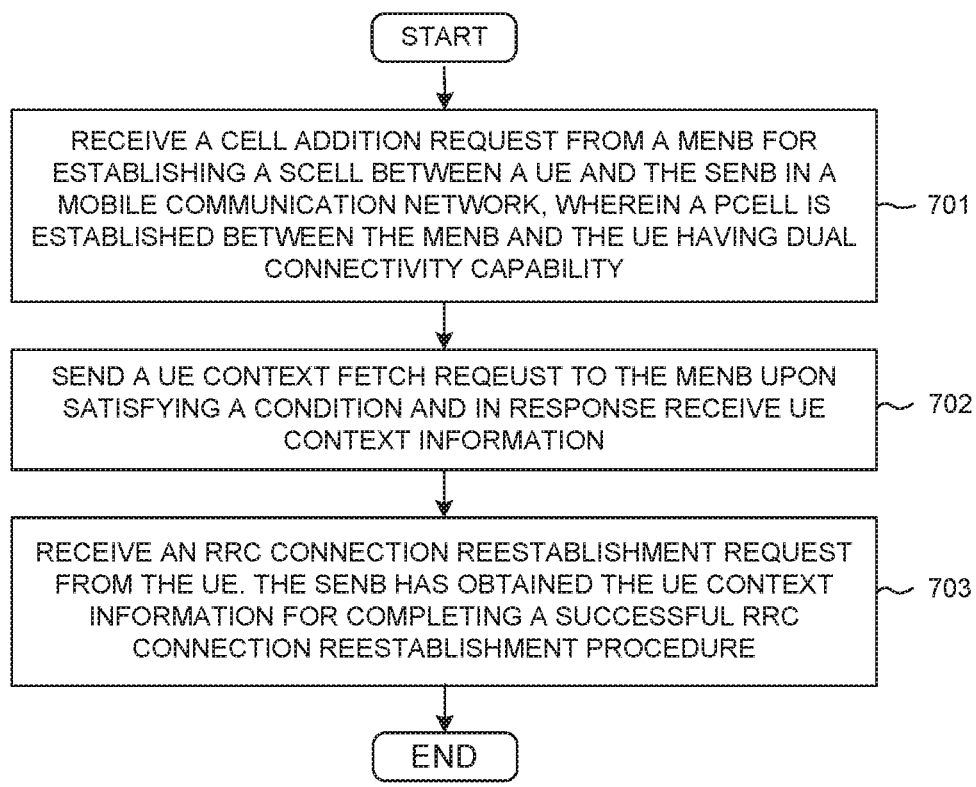
FIG. 7 is a flow chart of a method of RRC reestablishment on SeNB from SeNB perspective in a small cell network in accordance with one novel aspect.

FIG. 7 is a flow chart of a method of RRC reestablishment on SeNB from SeNB perspective in a small cell network in accordance with one novel aspect. In step 701, a secondary base station (SeNB) receives a cell addition request from a master base station (MeNB) for establishing a secondary cell (SCELL) between a UE and the SeNB in a mobile communication network. A primary cell (PCELL) is established between the MeNB and the US having dual connectivity capability. In step 702, the SeNB sends a UE context fetch request to the MeNB upon satisfying a condition and in response receives UE context Information. In step 703, the SeNB receives an RRC connection reestablishment request from the US. The SeNB has obtained the UE context information for completing a successful RRC connection reestablishment procedure.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
    (a) receiving a cell addition request from a master base station (MeNB) for establishing a secondary cell (SCELL) between a user equipment (UE) and a secondary base station (SeNB) in a mobile communication network, wherein the SeNB has a smallcell coverage, wherein a primary cell (PCELL) exists and is served by the MeNB, and wherein the UE seeks dual connectivity both with the MeNB and with the SeNB;
    (b) sending a UE context fetch request to the MeNB;
    (c) in response to the UE context fetch request having been sent in (b) receiving UE context information from the MeNB; and
    (d) receiving an RRC connection re-establishment request from the UE, wherein the SeNB has obtained the UE context information for completing a successful RRC re-establishment procedure with the UE, wherein (a), (b), (c) and (d) occur in sequence, and wherein (a) through (d) are performed by the SeNB.

2. A method comprising:
    (a) receiving a cell addition request from a master base station (MeNB) for establishing a secondary cell (SCELL) between a user equipment (UE) and a secondary base station (SeNB) in a mobile communication network, wherein the SeNB is in a macrocell coverage hole of the MeNB, wherein a primary cell (PCELL) exists and is served by MeNB and wherein the UE seeks dual connectivity both with the MeNB and with the SeNB;

(b) sending a UE context fetch request to the MeNB;

(c) in response to the UE context fetch request having been sent in (b) receiving UE context information from MeNB; and (d) receiving an RRC connection re-establishment request from the UE, wherein SeNB has obtained the UE context information for completing a success al RRC re-establishment procedure with the US, wherein (a), (b), (c) and (d) occur in sequence, and wherein (a) through (d) are performed by e SeNB.

3. A method involving a primary cell (PCELL) that is served by a macro base station (MeNB) and a secondary cell (SCELL) that is served by a secondary base station (SeNB), wherein a user equipment (UE) has a radio resource control (RRC) connection with the MeNB, the method comprising:

(a) sending an RRC connection re-establishment request from the UE to the SeNB, wherein the SeNB has a smallcell coverage, wherein prior to the time the UE sends the RRC connection re-establishment request in (a) the SeNB had previously proactively sent a UE context fetch request to the MeNB and had previously received in response UE context information back from the MeNB, wherein the UE context information that was previously received by the SeNB allows successful RRC re-establishment of the SeNB with the UE.

4. A method involving a primary cell (PCELL) that is served by a macro base station (MeNB) and a secondary cell (SCELL) that is served by a secondary base station (SeNB), wherein a user equipment (UE) has a radio resource control (RRC) connection with the MeNB, the method comprising:

(a) sending an RRC connection re-establishment request from the UE to the SeNB, wherein the SeNB is in a macrocell coverage hole of the MeNB, wherein prior to the time the UE sends the RRC connection re-establishment request in (a) the SeNB had previously proactively sent a UE context fetch request to the MeNB and had previously received in response UE context information back from the MeNB, wherein the UE context information that was previously received by the SeNB allows successful RRC re-establishment of the SeNB with the UE.

5. The method of claim 3, wherein the sending of the proactive UE context fetch request by the SeNB was triggered due to the SeNB, having had the smallcell coverage.

6. The method of claim 4, wherein the sending of the proactive UE context fetch request by the SeNB was triggered due to the SeNB, having been located in the coverage hole of the MeNB.

7. The method of claim 3, wherein UE context information comprises a physical cell ID of the PCELL, a cell radio network temporary identifier (C-RNTI) of the UE, and a short MAC-I of the UE.

8. The method of claim 4, wherein UE context information comprises a physical cell ID of the PCELL, a cell radio network temporary identifier (C-RNTI) of the UE, and a short MAC-I of the UE.

* * * * *

UNITED STATES PATENT AND TRADEMARK OFFICE
CERTIFICATE OF CORRECTION

PATENT NO. : 9,980,159 B2  
APPLICATION NO. : 14/863533  
DATED : May 22, 2018  
INVENTOR(S) : Li-Chuan Tseng Page 1 of 1

It is certified that error appears in the above-identified patent and that said Letters Patent is hereby corrected as shown below:

In the Claims

Column 9, Line 13, the word "success al" should be "successful"

Column 9, Line 14, the word "US" should be "UE"

Column 9, Line 15, the word "e" should be "the"

Signed and Sealed this  
Thirty-first Day of July, 2018

Andrei Iancu  
*Director of the United States Patent and Trademark Office*